Oct. 18, 1955
D. W. LYSETT
2,720,958
VIBRATION DAMPENER FOR CLUTCH PLATES
Filed Oct. 3, 1951
2 Sheets-Sheet 1
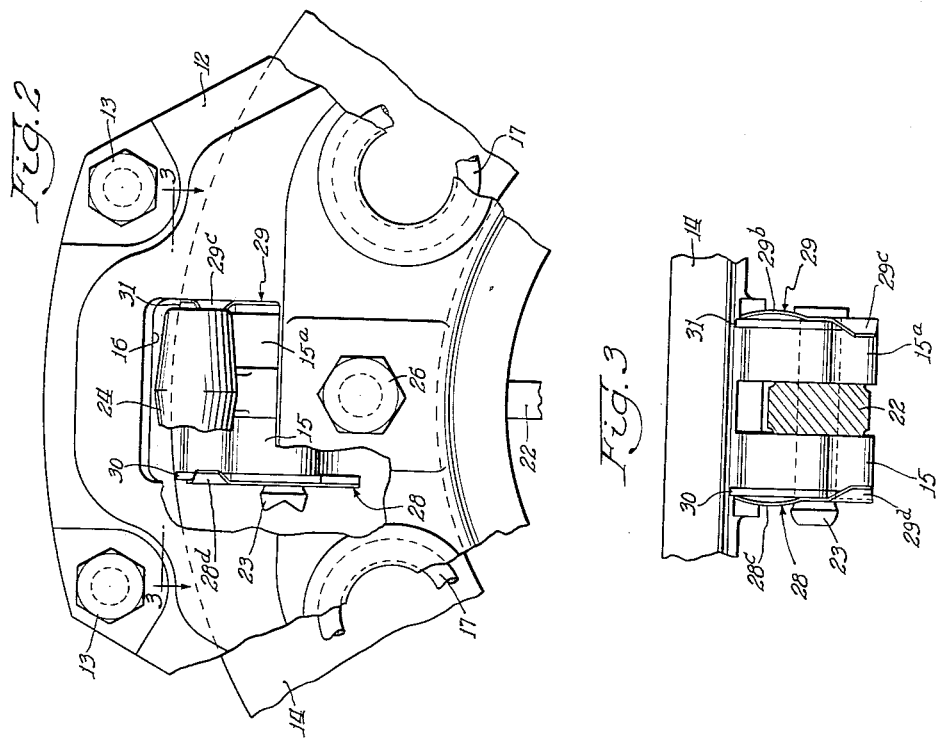
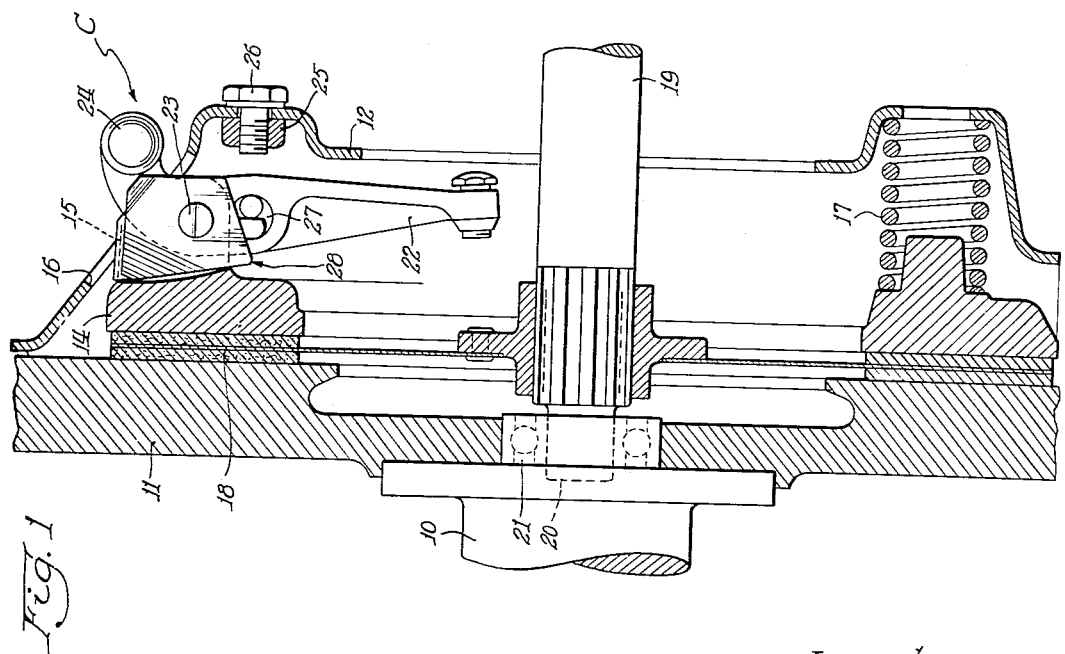
Inventor:
Daniel W. Lysett
By: H. J. Schmid
Atty.

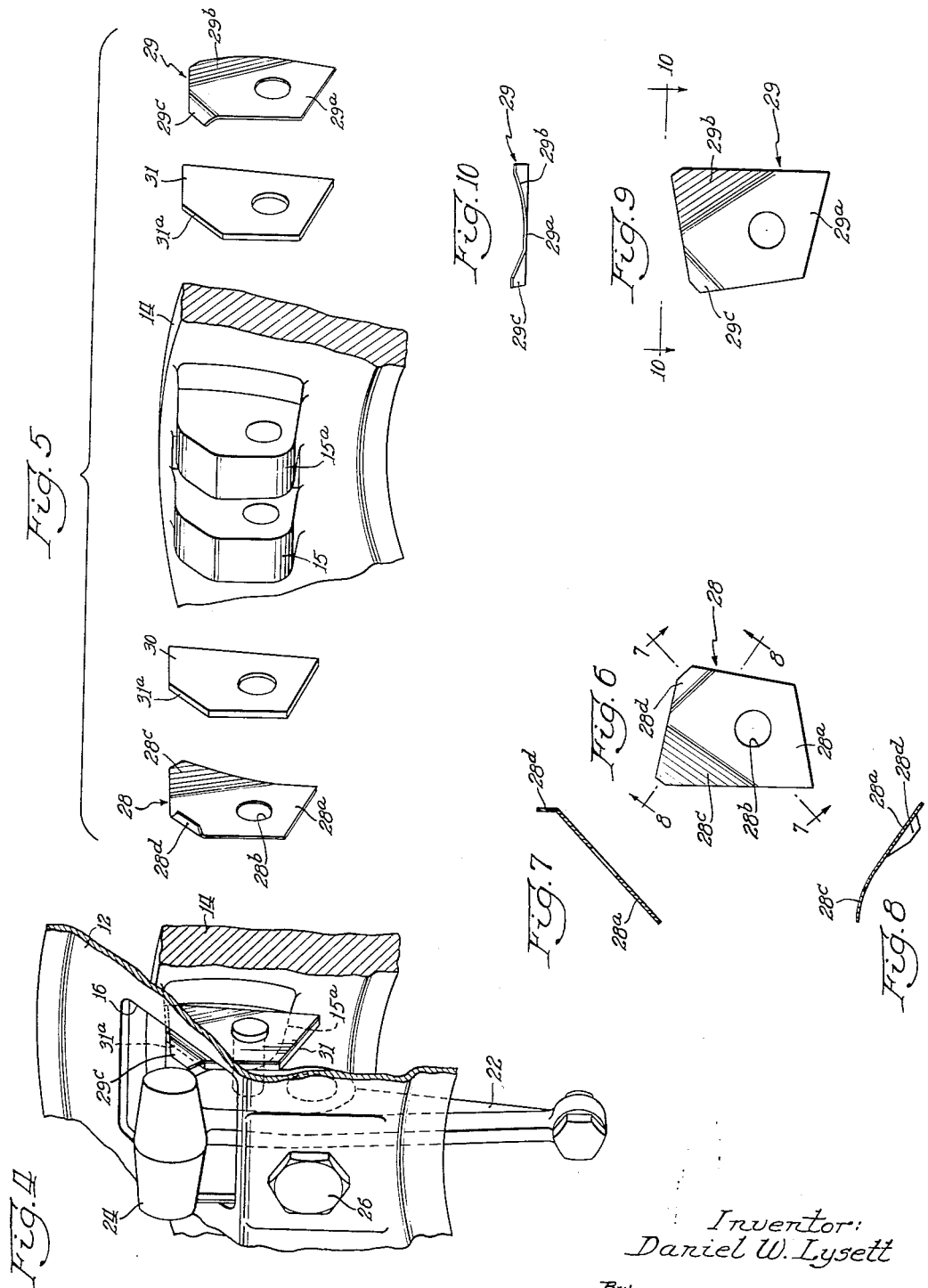

United States Patent Office 2,720,958
Patented Oct. 18, 1955

2,720,958

VIBRATION DAMPENER FOR CLUTCH PLATES

Daniel W. Lysett, Utica, Mich., assignor to Borg-Warner Corporation, Chicago, Ill., a corporation of Illinois Application October 3, 1951, Serial No. 249,562

11 Claims. (Cl. 192—109)

This invention relates to clutches of the type embodying driving members having connecting portions operable to rotate said members as a unit while guidingly supporting one of said members for axial movement relative to the other member, and more particularly, to means for absorbing vibrations normally transmitted from one member to the other member.

Clutches, used with automotive engines, employ a pressure plate movably mounted on a supporting structure, connected to the engine crankshaft, to engage a driven plate to transmit drive from the engine to a driven shaft, and the plates are released by control structure, usually mechanical linkage, manually operable by the operator to interrupt the transmission of power by the clutch. At certain engine speeds and when the clutch plates are released, torsional disturbances or vibrations and bending of the engine crankshaft causes the pressure plate to vibrate and rattle against its supporting structure causing an objectionable noise transmitted through the mechanical control linkage to the automobile operator.

For example, in many clutches, the pressure plate is provided with drive lugs positioned within apertures in a supporting cover plate, usually a sheet metal stamping, and, in the released condition of the clutch, the pressure plate can be said to be almost a free body being restrained only through the friction created in the mechanical control linkage attached thereto. If there is any play allowing any limited relative movement between the pressure plate and the cover plate, the pressure plate will tend to rattle due to the pressure plate lugs vibrating and hitting against the walls of the cover plate apertures. While such rattle condition could be avoided by closely fitting the lugs in the apertures of the cover plate, it has been found impractical since heat expansion of the pressure plate, during clutch operation, would cause the lugs to bind in the apertures and result in defective clutch operation, such as clutch slippage.

It is an object of the invention to provide a vibration-dampening and noise-eliminating device in clutch structures such as described.

It is another object of the invention to provide a vibration-dampening and noise-eliminating device in the form of resilient elements interposed between and yieldingly engaging connecting portions of relative axially movable and jointly rotatable clutch members.

It is another object of the invention to provide an anti-rattle device in the form of nonmetallic elements interposed between and engaging connecting portions of relatively axially movable and jointly rotatable clutch members.

It is a further object of the invention to provide a vibration-dampening and noise-eliminating device comprising resilient metallic elements and nonmetallic elements positioned between connecting portions of relatively axially movable and jointly rotatable clutch members to prevent the occurrence of rattling noise by the transmission of vibrations from one clutch member to the other.

Other objects and advantages of the invention will become apparent from the following description taken in connection with the drawings, in which:

Figure 1 is a vertical sectional view taken through a clutch in which a preferred form of the invention is incorporated;

Fig. 2 is a rear elevational view of a fragmentary portion of the clutch shown in Fig. 1;

Fig. 3 is an enlarged cross-sectional view taken substantially on line 3—3 of Fig. 2;

Fig. 4 is a perspective view of the clutch structure shown in Fig. 2;

Fig. 5 is an exploded view of certain portions of the clutch structure shown in Fig. 4 to more clearly illustrate the curved metallic wear plates and nonmetallic insulators of the noise-eliminating, vibration-dampening device of the invention.

Figs. 6–10, inclusive, are different views of the wear plates shown in Fig. 5, Fig. 6 being a side view of the wear plate shown at the left in Fig. 5, and Figs. 7 and 8 being sectional views thereof along the lines 7—7 and 8—8 of Fig. 6; and Figs. 9 and 10 being respective side and top edge views of the wear plate shown at the right in Fig. 5.

Referring to the drawings, and more particularly Figs. 1 and 2 thereof, the clutch, or power-transmitting device, generally indicated at C, is of the type illustrated and described in Wemp Patent 2,038,017 and the clutch may be associated with the usual flywheel of an internal combustion engine of an automobile, the crankshaft of such engine being illustrated at 10 and the flywheel at 11. A sheet metal cover plate 12 is secured to the metallic flywheel in any suitable manner as by bolts 13, to rotate therewith, and a clutch pressure plate 14, formed of steel or cast iron, is mounted for rotation on the cover plate 12 by a plurality of sets of lugs or bosses 15 and 15*a* extending through a plurality of circumferentially disposed apertures 16 in the cover plate 12. The pressure plate lugs 15 are guidingly and slidingly supported in the apertures 16 in the cover plate to provide a driving connection between the cover plate and the pressure plate to rotate the pressure plate in unison with the flywheel 11 while permitting axial movement of the pressure plate relative to the cover plate and flywheel. A plurality of coil springs 17 are disposed between the pressure plate 14 and the cover plate 12 for packing the pressure plate against a driven disc 18 so that the driven disc will be tightly engaged between the pressure plate and the flywheel.

The driven disc, or plate 18, is secured or splined to a driven shaft 19 having a reduced portion 20 piloted in the flywheel 11, being rotatably mounted therein by means of ball-bearing assemblies 21.

As shown in Fig. 2, a clutch-releasing lever 22 is mounted between the lugs 15 and 15*a* of each set on the pressure plate. Each lever is connected to the pressure plate lugs as shown in Figs. 1–4, wherein a pin 23 serves to mount the lever pivotally. Each lever 22 is provided with a weight 24 at its radially outer end extending through the aperture 16 in the cover plate 12. Each lever 22 is fulcrumed on the cover plate by bifurcated brackets 25 secured to the cover plate by means of bolts 26. The pivotal connection for fulcruming the levers on the brackets includes a pin and roller assembly 27 functioning as described in the aforesaid Wemp patent. The centrifugal levers are arranged as described so that the outward centrifugal force of the levers, as a whole, is taken by the pressure plate through the pivot pins 23 and the arrangement is such that the centrifugal force is translated into pressure for increasing the pressure with which the clutch is engaged over that provided by the springs 17. The clutch packing springs have the strength to pack the driven plate 18 between the pressure plate and the flywheel with just sufficient torque capacity to take care of maximum engine torque. The centrifugally weighted levers increase the clutch packing pressure upon rotation of the clutch to increase the torque capacity of the clutch as the kinetic energy of the engine and the rotary driving members of the clutch builds up incident to rotation. The description and function of the clutch levers 26 are more particularly pointed out in Wemp Patent 2,021,973.

The inner end of each release lever 22 is adapted to be contacted by a throw-out bearing (not shown) to rock the levers clockwise toward the pressure plate 14 to release engagement of the pressure plate 14 with the driven disc 18. The throw-out bearing is connected through mechanical control linkage to the foot clutch pedal operated by the driver of the vehicle to actuate the levers to effect disengagement of the clutch.

The present invention is directed to providing vibration-dampening and noise-insulating elements or devices in the form of thin steel polygonal leaf spring plates, respectively identified at 28 and 29, and nonmetallic insulators, identified at 30 and 31 in the drawings. The engaged spring plate 28 and insulator 30 is interposed between the drive lug 15 and the adjacent side edge of the aperture 16 of the cover plate 12, the remote sides of the plate 28 and insulator 30 respectively engaging the aperture side wall and the lug 15. The spring plate 29 and insulator 31 is interposed between the drive lug 15a and the adjacent side edge of the aperture 16 of the cover plate 12, the plate 29 engaging the lug 15a and the insulator 31 engaging the aperture side wall.

The plates 28 and 29 and insulating elements 30 and 31, effectively dampen vibrations and eliminate noise in the clutch previously caused by torsional disturbances or vibrations in the engine crankshaft being communicated to the cover plate and then to the pressure plate so that the cover plate and pressure plate oscillated relative to each other on their axes causing the pressure plate drive lugs to strike against the adjacent side edges of the cover plate apertures resulting in rattle and ensuing objectionable noises transmitted through the mechanical control linkage of the clutch to the foot pedal to the annoyance of the operator of the automobile, such rattle usually occurring when the pressure plate was released from its engagement with the driven plate.

It will be seen from an inspection of the drawings that the spring plates 28 and 29 and insulating elements 30 and 31 are held in position between the drive lugs 15 and 15a, respectively, of the pressure plate and the opposite side walls of the apertures of the cover plate by the headed pin 23 extending through the washers 28, 29, the insulators 30 and 31, and the drive lugs 15 and 15a, the head of the pin engaging the wear plate 29 and the opposite end of the pin being staked to engage the wear plate 28.

Referring to Figs. 5–10, inclusive, for a description of the washers 28 and 29 and the insulating members 30 and 31 and, referring first to the wear plate 28 and the insulating element 30 assembly, the wear plates 28 and 29 are thin steel leaf springs. As seen in Figs. 5–8, inclusive, the body 28a of the spring plate 28 has an opening 28b therein for receiving the pin 23 and is flat merging with a laterally offset portion indicated at 28c inclined at an angle thereto to extend toward the lug 15 on the pressure plate. As shown in Fig. 8, the laterally offset portion 28c of the plate 28 is curved with respect to the flat body portion 28a of the plate. The body portion 28a of the plate 28 also merges with another laterally offset portion 28d in spaced relation to the curved portion 28c of the plate. The laterally offset portion 28d is bent to define a 45° angle with respect to the plane of the body portion 28a of the plate for the purpose of facilitating assembly. More particularly, because of the curvature of the plate, it does not lie flat against the side of the pressure plate lug 15. Consequently, when the cover plate is fitted over the lugs, it is necessary to provide a laterally offset portion 28d in the spring plate to provide a guide to cause the pressure plate lugs to enter the aperture in the cover plate. When the pressure plate is assembled with the cover plate, the insulators 30 are firmly held against the lug 15 with the curved portion 28c of the plate engaging the side wall of the aperture 28c and being almost flattened out, resulting in a certain amount of circumferential pre-loading between the pressure plate and the cover plate. It will be apparent that the wear plate 28 has its flat body portion 28a and the edges of its curved portion 28c engaging the nonmetallic insulating element 30 at one side thereof, and the arcuate curve in the portion 28c engaging the side wall of the aperture in the cover plate when the plate 28 is in assembly with the cover and pressure plates.

Fig. 5 illustrates that the nonmetallic insulating element 30 is flat and has substantially the same general configuration in side elevation as the plate 28 with the exception that the element is beveled at 31a, the insulating element 30 being disposed at the same angle as the portion 28d of the plate 28 to permit the portion 28d to extend over the insulating member 30 for purposes of assembly.

Referring to the wear plate 29 and insulating element 31 assembly interposed between the pressure plate lug 15a and the adjacent side wall of the aperture 16 of the cover plate, the insulating element 31 is identical in shape and form to the insulating element 30 previously described. The spring plate 29, as shown in Figs. 5, 9 and 10, is provided with a flat body portion 29a and an angularly offset curved portion 29b oppositely curved to the curved portion 28c of the plate 28. The body portion 29a also merges with a laterally offset portion 29c which is bent at a 45° angle to the plane of the body portion 29a for purposes of assembly with the insulating element 31 and the drive lug 15a, the portion 29c extending over the similarly angled edge 31a of the insulating element 31 and overlapping and engaging the drive lug 15a, in a manner similar to and for the purpose described with respect to the wear plate 28 and insulating element 30. More particularly, the edge 29c at the corner of the wear plate 29 is designed to permit the pressure plate lug 15a to enter the aperture in the cover plate. It will be apparent that when the pressure plate, the cover plate and the wear plate 29 and insulating element 31 are assembled, the curvature in the wear plate 29 is almost flattened out resulting in a certain amount of circumferential pre-loading between the pressure plate and cover plate.

It will be apparent from the foregoing description that the combination of the wear plates 28 and 29 and the nonmetallic insulating elements 30 and 31, when disposed at opposite sides of the drive lugs 15 and 15a and compressed between these lugs and the side walls of the apertures in the cover plate 12, will effectively absorb any vibrations originating in the crankshaft and transmitted to the cover plate which might cause rattle of the pressure plate drive lugs against the side walls of the aperture in the cover plate. The nonmetallic insulating elements 30 and 31, acting in conjunction with the spring action of the plates 28 and 29, effectively dampen out and absorb the vibrations and prevent rattle of the pressure plate lugs on the cover plate and thus eliminate objectionable noises by preventing relative oscillation of the cover plate and pressure plate about their axes, particularly in the released condition of the clutch. The spring action of the plates 28 and 29 is such as not to interfere with the axial shifting of the pressure plate in its movement for engaging and disengaging the driven clutch disc 18. The steel wear plates also effectively prevent abrasion of the nonmetallic elements by the side walls of the cover plate apertures during axial movement of the pressure plate, as the plates engage the aperture side walls.

Examples of materials that may be employed in the insulating elements 30 and 31 which may be preferably and satisfactorily employed either by forming or molding the insulating elements 30 and 31 may be either of the following nonmetallic compositions:

1. Laminated plastic consisting of cotton fabric treated with a phenolic resin and bonded under considerable heat and pressure.
2. Cork granules bonded together with a synthetic rubber which may be a polymer of monochlorbutadiene (commonly known by its trade name, Neoprene) or a copolymer of butadiene and acrylonitrile (commonly known by its trade name, Buna-H).
3. Cork granules bonded together with a phenolic resin.
4. Synthetic rubber, such as identified above and preferably of 40 durometer hardness.

In view of the foregoing, it will be apparent that I have provided new and improved vibration-dampening and noise-insulating elements for use between connecting portions of relatively axially shiftable and jointly rotatable clutch elements for the purpose of effectively dampening vibrations and eliminating noise in the clutch caused by the clutch in its released condition and under certain engine operating conditions. While I have specifically described a preferred embodiment for performing this function, it will be understood that modifications may be provided without departing from the spirit and scope of the invention as it is contemplated that any single individual element in the form of a spring plate or nonmetallic insulating element will effectively dampen vibrations and ensuing noise when located as described herein. For example, a curved spring plate on one side or the other, or such plates on both sides, of the pressure plate lugs, or, alternatively, a single nonmetallic insulator similarly interposed between the pressure plate lugs and the side walls of the aperture of the cover plate, have been found effective. Also, the combination of a flat steel plate and flat nonmetallic insulator bonded together provide a combination of the vibration absorption capacity of the insulating material with the wear-resistance of the steel plate which has also given good results, the steel plate preventing the abrasion and eventual destruction of the insulators by the steel plates engaging the relatively movable side walls of the cover plate apertures. It will therefore be apparent that the invention is not to be confined to the preferred embodiment thereof illustrated and described but only as the invention is defined by the scope of the following claims.

I claim:

1. In a clutch, the combination of a plurality of metallic clutch members having portions connecting said members for conjoint rotation and relative axial movement, a leaf spring separable from said members interposed between and spacing, and distorted by, said connecting portions of said clutch members for preventing the transmission of vibrations through said connecting portions from one clutch member to the other member.

2. In a clutch, the combination of a plurality of metallic clutch members having portions connecting said members for conjoint rotation and relative axial movement, and a vibration-dampening assembly interposed between the connecting portions of said members including a resilient element engaging the connecting portion of one of said members, and a nonmetallic element engaging the connecting portion of the other of said members and said resilient element.

3. In a clutch, the combination of a plurality of metallic clutch members having portions connecting said members for conjoint rotation and relative axial movement, and a vibration-dampening assembly interposed between and compressed by the connecting portions of said members during the transmission of drive between said members including a spring engaging the connecting portion of one of said members, and a nonmetallic element engaging the connecting portion of the other of said members and said spring.

4. In a clutch, the combination of a plurality of metallic clutch members having portions connecting said members for conjoint rotation and relative axial movement, and a vibration-dampening assembly interposed between the connecting portions of said members including a leaf spring engaging the connecting portion of one of said members, and a nonmetallic element engaging the connecting portion of the other of said members and said leaf spring.

5. In a clutch, the combination of a driving member having lugs projecting therefrom, a driving member having apertures receiving said lugs for drivingly connecting said members and for relative axial movement of said members, and leaf spring separable from said members interposed between and distorted by said lugs and the side walls of said apertures for preventing the transmission of vibrations from one of said members to the other of said members.

6. In a clutch, the combination of a sheet metal cover plate formed with apertures therein, an axially shiftable pressure plate having lugs projecting into said apertures, and leaf springs separable from said plates disposed between and distortable by said lugs and the side walls of said apertures for preventing the transmission of vibrations from said cover plate to said pressure plate.

7. In a clutch, the combination of a sheet metal cover plate formed with apertures therein; a pressure plate having lugs projecting into said apertures; vibration-dampening assemblies interposed between each lug and the side walls of the aperture receiving the same and each including a resilient metallic element engaging an aperture side wall, and a nonmetallic element engaging said lug and said resilient element, said resilient element being distorted by said nonmetallic element and said aperture side wall.

8. In a clutch, the combination of a sheet metal cover plate formed with apertures therein; a pressure plate having lugs projecting into said apertures; vibration-dampening assemblies interposed between each lug and the side walls of the aperture receiving the same and each including a leaf spring engaging an aperture side wall, and a nonmetallic element engaging said lug and said leaf spring, said leaf spring being distorted by said nonmetallic element and said aperture side wall.

9. In a clutch, the combination of a sheet metal cover plate formed with apertures therein; a pressure plate having lugs projecting into said apertures; vibration-dampening assemblies interposed between each lug and the side walls of the aperture receiving the same and each including a vibration-absorbing nonmetallic plate engaging said lug, a resilient metallic plate having a curved portion engaging an aperture side wall, said resilient plate having a laterally offset portion overlying said nonmetallic plate to facilitate passage of said lug into said aperture in the assembly thereof, said curved portion of said metallic plate being distorted by said aperture side wall and said nonmetallic plate.

10. In a clutch, the combination of a sheet metal cover plate formed with apertures therein; a pressure plate having lugs projecting into said apertures; vibration-dampening assemblies interposed between each lug and the side walls of the aperture receiving the same and each including a vibration-dampening nonmetallic plate engaging said lug, a leaf spring engaging an aperture side wall and having an angularly offset portion overlying said nonmetallic plate to facilitate passage of said lug into said aperture in the assembly thereof, said leaf spring being distorted by said aperture side wall and said nonmetallic plate.

11. In a clutch, the combination of a driving member having lugs projecting therefrom, a driving member having apertures receiving said lugs for drivingly connecting said members and for relative axial movement of said members, and a metallic wear plate and a nonmetallic vibration-absorbing plate interposed between each lug and an adjacent side wall of said aperture, said plates being secured to said lugs.

References Cited in the file of this patent

UNITED STATES PATENTS

| | | |
|---|---|---|
| 1,415,841 | Seitz | May 9, 1922 |
| 1,799,630 | Matthews | Apr. 7, 1931 |
| 2,017,915 | Moorhouse | Oct. 22, 1935 |
| 2,058,440 | Gregg | Oct. 27, 1936 |
| 2,090,264 | Podgett | Aug. 17, 1937 |
| 2,126,760 | Eason | Aug. 16, 1938 |
| 2,183,001 | Wolfram | Dec. 12, 1939 |
| 2,255,243 | Fawick | Sept. 9, 1941 |
| 2,327,389 | Bagnall | Aug. 24, 1943 |
| 2,575,765 | Nabstadt et al. | Nov. 20, 1951 |

FOREIGN PATENTS

| | | |
|---|---|---|
| 134,695 | Germany | Sept. 30, 1902 |
| 993,466 | France | July 25, 1901 |